(12) United States Patent
Suto et al.

(10) Patent No.: US 6,211,267 B1
(45) Date of Patent: Apr. 3, 2001

(54) METHOD FOR THE CONTINUOUS PRODUCTION OF ORGANOPOLYSILOXANE GUM SOLUTION

(75) Inventors: Fumitaka Suto, Fukui; Hideyuki Mori; Norikatsu Higuchi, both of Chiba; Norio Matsuda, Fukui, all of (JP)

(73) Assignee: Dow Corning Toray Silicone, Ltd., Tokyo (JP)

( * ) Notice: Subject to any disclaimer, the term of this patent is extended or adjusted under 35 U.S.C. 154(b) by 0 days.

(21) Appl. No.: 09/429,149

(22) Filed: Oct. 28, 1999

(30) Foreign Application Priority Data

Nov. 2, 1998  (JP) .................................. 10-327469

(51) Int. Cl.⁷ ................ B29B 1/10; B29B 7/00; C08K 5/01
(52) U.S. Cl. ............. 524/81; 524/261; 524/588; 366/301
(58) Field of Search ................. 366/301; 524/81, 524/261, 588

(56) References Cited

U.S. PATENT DOCUMENTS

| 4,534,652 | * | 8/1985 | Stade . |
| 5,505,591 | * | 4/1996 | Tynan . |
| 5,806,975 |   | 9/1998 | Hosokawa et al. .................. 366/301 |

\* cited by examiner

Primary Examiner—Robert Dawson
Assistant Examiner—Kuo-Liang Peng
(74) Attorney, Agent, or Firm—James L. DeCesare

(57) ABSTRACT

A highly productive method for the continuous production of homogeneous solutions of organopolysiloxane gums is carried out by mixing a solvent and an organopolysiloxane gum. It is characterized by using for mixing, a twin screw compounding extruder which is self-cleaning in which the extruder has at least 2 solvent feed ports downstream from the gum feed port and the internal pressure in the extruder is maintained at a value from 0.00981 to 0.981 MPa during the process.

6 Claims, 2 Drawing Sheets

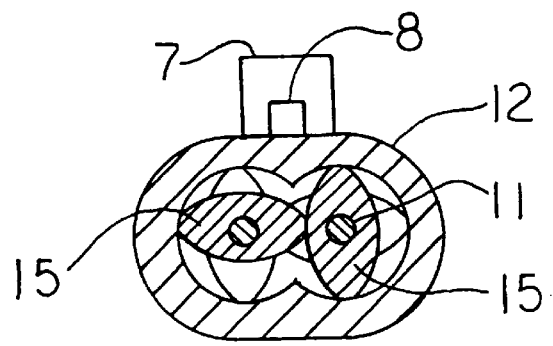
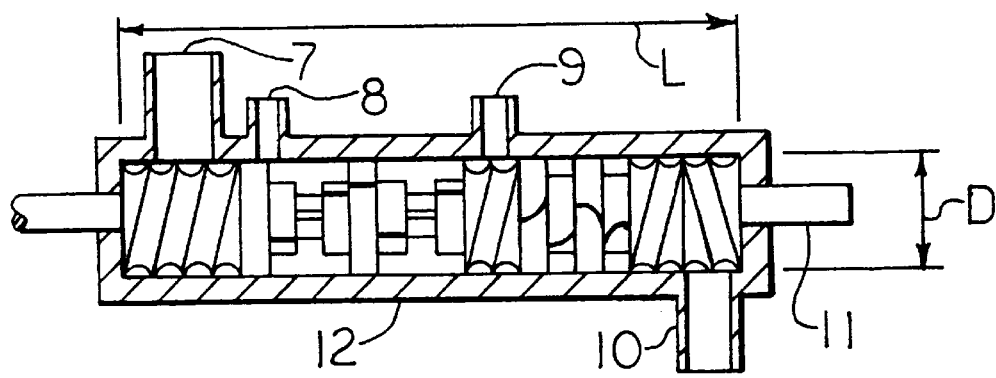
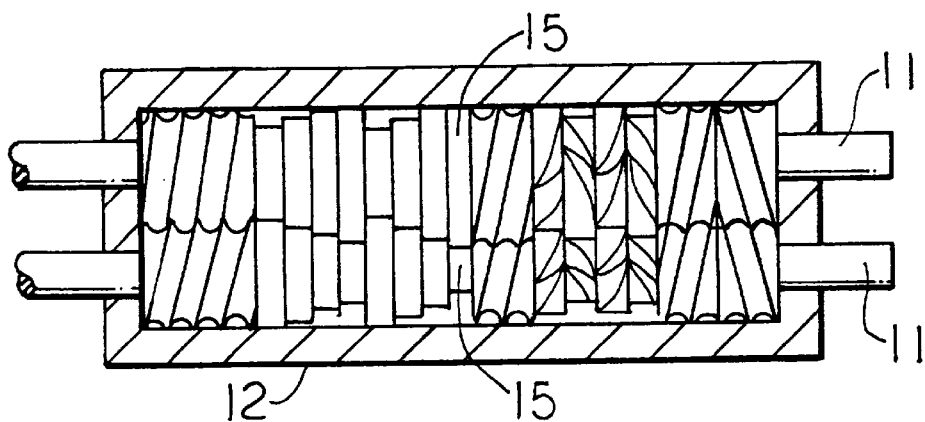

METHOD FOR THE CONTINUOUS PRODUCTION OF ORGANOPOLYSILOXANE GUM SOLUTION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a method for the continuous production of organopolysiloxane gum solutions. More particularly, the invention relates to a highly productive method for the continuous production of homogeneous solutions of organopolysiloxane gums.

BACKGROUND OF THE INVENTION

Organopolysiloxane gum solutions are widely used in the industrial and commercial spheres as cosmetic bases, release agents, lubricants, and lustrants. These organopolysiloxane gum solutions are typically produced by mixing the starting organopolysiloxane gum and solvent, for example, mineral oil or organopolysiloxane fluid, in a planetary mixer such as a Henschel mixer using a batch process. Batch mixing, however, requires long mixing times in order to dissolve organopolysiloxane gums that have a high degree of polymerization.

To improve the mixing efficiency in such cases, the organopolysiloxane gum or solvent can be divided into portions for introduction into the mixer, but this in turn requires substantial inputs of labor. In addition, when an attempt is made to raise the concentration of the organopolysiloxane gum in the organopolysiloxane solution, a corresponding increase in the viscosity impairs mixing to the point that the quality of the solution may no longer be constant.

BRIEF SUMMARY OF THE INVENTION

The object of the present invention is to provide a highly productive method for the continuous production of homogeneous solutions of organopolysiloxane gums. The method is characterized by the use of a twin screw compounding extruder having a self-cleaning function. The compounding extruder is provided with at least 2 solvent feed ports downstream from the organopolysiloxane gum feed port, and the internal pressure in the compounding extruder is from 0.00981 to 0.981 MPa.

The method can be used in the continuous production of organopolysiloxane gum solutions that have a viscosity at 25° C. of 10 to 5,000,000 mPa·s, by mixing a solvent with a viscosity at 25° C. of 0.65 to 5,000 mPa·s with an organopolysiloxane gum that has a plasticity at 25° C. of 75 to 200 as measured by the plasticity test in Section 8 of Japanese Industrial Standard K 6249.

These and other features of the invention will become apparent from a consideration of the detailed description.

BRIEF DESCRIPTION OF THE SEVERAL VIEWS OF THE DRAWING

FIG. 2 is a cross-sectional view taken along line 2—2 in FIG. 1 of the region of the compounding extruder containing paddles with a convex lens-shaped cross section mounted on a pair of axles.

FIG. 3 is a side view shown partly in cross section of the barrel of the compounding extruder depicted in FIG. 1 showing the relationship between the length (L) and diameter (D).

FIG. 4 is similar to FIG. 3 and shows the top view partly in cross section of the barrel of the compunding extruder depicted in FIG. 1 containing two axles.

DETAILED DESCRIPTION OF THE INVENTION

Figure 1:
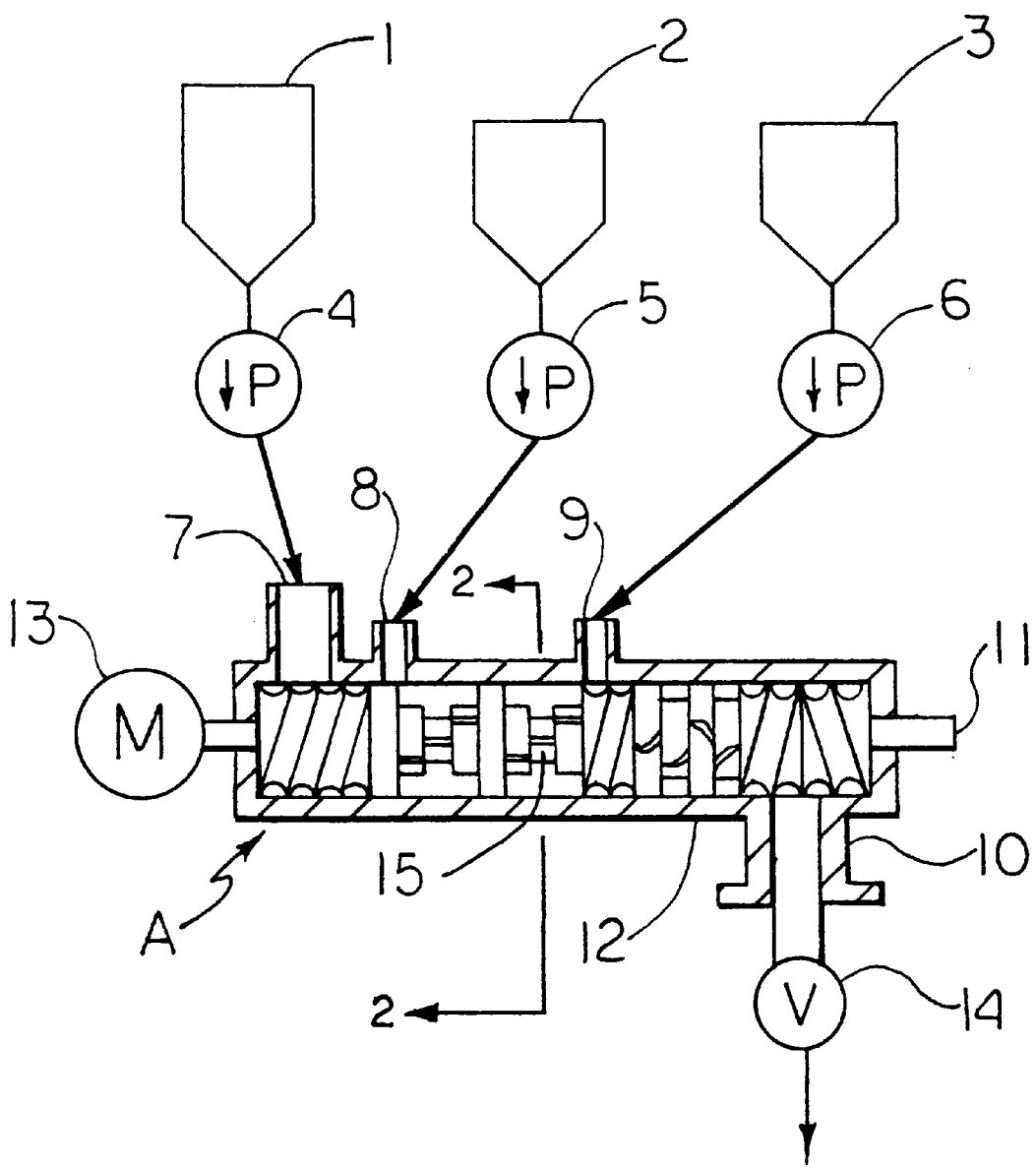
FIG. 1 is a pictorial representation of a co-rotating intermeshing twin screw compounding extruder, shown partly in cross section, used in the examples of the invention.

With reference to the drawings, there can be seen in FIG. 1 a co-rotating intermeshing twin screw compounding extruder having a self-cleaning function shown generally at A. Extruder A is supplied with materials to be processed and mixed by an organopolysiloxane gum storage tank 1, a first solvent storage tank 2, a second solvent storage tank 3, an organopolysiloxane gum feed pump 4, a first solvent feed pump 5, a second solvent feed pump 6, an organopolysiloxane gum feed port 7, a first solvent feed port 8, and a second solvent feed port 9. The final product exits extruder A by means of a discharge port 10.

The interior of extruder A contains a pair of mixing element-equipped axles 11 each having a screw conveyor section and a section containing a series of paddles 15 surrounded by barrel 12 of the extruder. As can be seen in FIG. 2, the barrel 12 has a figure eight shaped cross section whereas each of the paddles 15 are convex lens-shaped in cross section.

Motor 13 drives the twin axles 11, and a ball valve 14 is used to control the amount of the final product which is discharged from extruder A through the port 10. Such compounding extruders are generally known in the prior art, e.g., U.S. Pat. 5,806,975 (Sep. 15, 1998).

The organopolysiloxane gum used in this invention has a gum-like consistency at ambient temperature, and preferably has a plasticity at 25° C. of 75 to 200 as measured by the plasticity test in Section 8 of Japanese Industrial Standard K 6249. Its particular type is not critical, however. It will ordinarily have a straight-chain molecular structure, but a partially branched straight-chain molecular structure can also be used.

Such organopolysiloxane gums can be described by the average compositional formula $R_a SiO_{(4-a)/2}$ in which the subscript a has an average value of 1.9 to 2.1, and wherein R is a monovalent hydrocarbon group. R is exemplified by alkyl groups such as methyl, ethyl, and propyl; aryl groups such as phenyl and tolyl; alkenyl groups such as vinyl, allyl, and hexenyl; and groups provided by replacing a portion of the carbon-bonded hydrogen in alkyl groups with, for example, a fluorine atom, an amino group, or an epoxy group, among which can be named groups such as 3-aminopropyl or 3,3,3-trifluoropropyl.

At least 50 mole percent of R groups in each molecule will ordinarily be methyl, while R groups occurring at the molecular chain terminals may be replaced by hydroxyl or alkoxy groups. While the organopolysiloxane gum preferably has a plasticity at 25° C. of 75 to 200 as measured by the plasticity test in Section 8 of Japanese Industrial Standard K 6249, it most preferably has a value of 100 to 185.

The organopolysiloxane gums are typically synthesized by the equilibration polymerization or condensation polymerization of diorganosiloxane oligomers in the presence of a basic catalyst or chlorophosphazene catalyst. The organopolysiloxane gums can be specifically exemplified by trimethylsiloxy-endblocked dimethylpolysiloxane gums, dimethylvinylsiloxy-endblocked dimethylpolysiloxane gums, dimethylvinylsiloxy-endblocked dimethylsiloxane-methylvinylsiloxane copolymeric gums, silanol-endblocked dimethylpolysiloxane gums, silanol-endblocked dimethylsiloxane-methylvinylsiloxane copolymeric gums, trimethylsiloxy-endblocked dimethylsiloxane-methylphenylsiloxane copolymeric gums, silanol-endblocked dimethylsiloxane-methylphenylsiloxane copolymeric gums, trimethylsiloxy-endblocked dimethylsiloxane-diphenylsiloxane copolymeric gums, silanol-endblocked dimethylsiloxane-diphenylsiloxane copolymeric gums, trimethylsiloxy-endblocked dimethylsiloxane-methyl(3,3,3-trifluoropropyl)siloxane copolymeric gums, and silanol-endblocked dimethylsiloxane-methyl(3,3,3-trifluoropropyl)siloxane copolymeric gums.

Optional additives can be present in the organopolysiloxane gum, such as silica micropowders, surface treatment agents for the silica micropowders, heat stabilizers, and pigments, provided the objectives of the invention are not impaired.

The solvent used to dissolve the organopolysiloxane gum should be a fluid capable of dissolving organopolysiloxane gums. It can have a viscosity at 25° C. of 0.65 to 5,000 mPa·s, and is exemplified by liquid aromatic hydrocarbons such as toluene and xylene; liquid aliphatic hydrocarbons such as hexane, heptane, octane, and cyclohexane; mineral oil; liquid paraffins; and organopolysiloxane fluids such as hexamethyldisiloxane, octamethyltrisiloxane, octamethylcyclotetrasiloxane, and dimethylpolysiloxane fluids. The solvent can also be a mixture of two or more of such individual solvents.

Any blending proportion between the organopolysiloxane gum and the solvent can be used at which dissolution of the organopolysiloxane gum is effective. However, the solvent is preferably used at from 10 to 1,000 weight parts, and more preferably at from 25 to 400 weight parts, which in each case is based upon 100 weight parts of the organopolysiloxane gum.

As can be seen by reference, for example to FIG. 4, the twin screw compounding extruder A used for production of the organopolysiloxane gum solution should be a horizontal closed system, and should have two horizontal axles 11 disposed in parallel, each axle 11 being within a barrel 12 that has a figure eight shaped cross section. Each axle 11 should be equipped with screw conveyor sections and paddle blade sections 15, and the axles 11 should be rotated at the same velocity in the same or different directions, but preferably in the same direction. The rotation rate is preferably from 10 to 1,500 rpm, and more preferably from 100 to 1,000 rpm.

The L/D ratio in the mixing extruder A is preferably at least 7, and more preferably is at least 10, where L is the axial length of the compounding element equipped axle 11, and D is the diameter of rotation of the outer tip of the paddles 15. In this regard, reference may be had to FIG. 3. The clearance between the inside wall of the barrel 12 and the screw conveyor or paddles 15 is preferably no greater than 5 mm, and more preferably no greater than 1 mm.

In operation, the organopolysiloxane gum is supplied from the top 1 at one end of the barrel 12, and is transported to the compounding zone by the screw conveyor section of the two axles 11, mixed there by the paddles 15 with the solvents 2 and 3 supplied along the transport path, and then is continuously discharged from 14 at the bottom, side, or front face of the other end of the barrel 12. The paddles 15 should have a convex lens-like or pseudo-triangular cross section. The screw conveyor section of the axle 11 functions to feed the starting materials to the compounding zone. The axles may contain flat paddles have a kneading action, helical paddles have both a kneading action and a feed-forward action, and reversed helical paddles have both a kneading action and a backward-feed action. Each of the two axles 11 will carry a screw conveyor section and a section containing 20 to 40 paddles.

A pair of left and right convex lens-type paddles 15 installed on the two axles 11 can be 90 degrees out of phase, while a pair of pseudo-triangular paddles 15 can be in phase. These paddles 15 can be rotated in the same direction, while a small and constant clearance is maintained in order that the tip of each paddle will clean the side of another paddle. Accordingly, the introduced organopolysiloxane gum and solvent will be discharged by piston flow without stagnation, due to the self-cleaning activity between the paddles and the barrel, and between the screw conveyor.

A uniform composition can be rapidly generated by virtue of the fact that (i) the combination of paddles 15 compresses and stretches the material along the direction of the axles 11; rotation of the paddles 15 compresses and stretches the material in the direction perpendicular to the axles 11; and the organopolysiloxane gum and solvent are sheared and kneaded between the paddles 15 and barrel 12 and between the paddles themselves.

The self-cleaning activity exhibited by the twin screw compounding extruder A need not be present in all regions of the compounding extruder, and it will be sufficient for the self-cleaning activity to operate in at least a portion of the region in which the mixture is present.

When a twin screw compounding extruder has a self-cleaning function, it becomes necessary due to its low internal pressure, to apply a backpressure to the mixture discharge region 10, and to adjust the internal pressure of the extruder to 0.00981 to 0.981 MPa. The internal pressure can be raised, for example, by placing a ball valve 14 on the downstream side of the discharge port 10. If the internal pressure is not raised, any undissolved organopolysiloxane gum is not subjected to thorough shearing by the extruder, and passes through the device without dissolution, producing concentration variations in the organopolysiloxane gum solution.

The feed port 7 for the organopolysiloxane gum should be located on a top or side surface in the upstream section of the barrel 12 of figure eight shaped cross section, while at least 2 solvent feed ports 8 and 9 should be provided on a top or side surface of the barrel 12 downstream from feed port 7. The organopolysiloxane gum therefore first undergoes compounding with the solvent input through the first solvent feed port 8 and a portion of the gum is dissolved. Compounding is then continued with solvent input from the second solvent feed port 9 which induces a complete dissolution.

This procedure results in the production of an organopolysiloxane gum solution having a uniform concentration. The presence of only a single solvent feed region creates problems in that any shearing generated by paddles 15 is applied exclusively to the solvent, and not to the organopolysiloxane gum. The significance of this phenomenon increases when larger amounts of solvent are employed. The solvent feed port in such cases must therefore be placed at a location where little undissolved organopolysiloxane gum remains.

While only two solvent feed ports 8 and 9 are shown herein, it should be understood that three or more solvent feed ports may be used. The organopolysiloxane gum solution is discharged from discharge port 10 which can be located at the bottom, top, or side of barrel 12 at its downstream end. A filter (not shown) can be connected to discharge port 10 for removal of any foreign material.

The production method according to the present invention produces homogeneous organopolysiloxane gum solutions. These solutions have a viscosity at 25° C. from 10 to 5 million mPa·s, and they are useful as cosmetic bases, release agents, lubricants, or lustrants.

EXAMPLES

The following examples are set forth in order to illustrate this invention in more detail through working and comparative examples. Plasticity values in the examples were measured at 25° C. by a standard method described in Section 8, Plasticity Test, of Japanese Industrial Standard K 6249. The viscosity values were measured at 25° C. using a rotary viscometer.

Example 1

This example used a co-rotating intermeshing twin screw compounding extruder A having a self-cleaning function as generally depicted in the drawings to produce an organopolysiloxane gum solution. The organopolysiloxane gum feed port 7 was located at a position corresponding to an L/D=0.3 to 1.7 from the end on the upstream side of barrel 12. The first solvent feed port 8 was located at a position corresponding to an L/D=2.8 from the end on the upstream side of barrel 12. The second solvent feed port 9 was located at a position corresponding to an L/D=6.2 from the end on the upstream side of barrel 12. A pressure gauge was placed at a location corresponding to L/D=4.2 from the end on the upstream side of barrel 12. The diameter of the screw in the screw conveyor portion of axle 11 was 50 mm and the L/D was equal to 8.9. The minimum gap between the tips of the paddles 15 and the interior wall of the barrel 12 was 0.5 mm. The screw containing axle 11 and the paddles 15 of a convex lens-shaped cross section were disposed in such manner that starting material was filled into the twin screw compounding extruder A. The effective volume was 0.8 L. While the axle 11 was rotated at 350 rpm, 100 weight parts a trimethylsiloxy-endblocked dimethylpolysiloxane gum with a plasticity=125, was continuously fed from organopolysiloxane gum feed port 7 into the barrel 12. 26.9 weight parts of liquid paraffin having a viscosity at 40° C.=1.9 mPa·s, was continuously fed into the barrel 12 from the first solvent feed port 8. 26.9 weight parts of the liquid paraffin was also continuously fed into the barrel 12 from the second solvent feed port 9. A homogeneous organopolysiloxane gum solution was obtained from discharge port 10. The composition was uniform up to 100 kg/hour as an organopolysiloxane gum solution. The ball valve 14 was adjusted to produce an internal pressure of 0.39 MPa in the twin screw compounding extruder A during this procedure.

The resulting organopolysiloxane gum solution was placed on a polyester film and spread out into a thin film and examined for the presence of undissolved organopolysiloxane gum. It was found that there existed no undissolved organopolysiloxane gum. The organopolysiloxane gum solution was placed in a sample bottle, and its viscosity was measured at 1 million mPa·s. It did not undergo any timewise variations.

Example 2

This example employed the extruder A used in Example 1 which was operated at a rotation rate of 350 rpm. 100 weight parts of a trimethylsiloxy-endblocked dimethylpolysiloxane gum having a plasticity=125 was continuously fed as in Example 1. 50 weight parts of a trimethylsiloxy-endblocked dimethylpolysiloxane fluid with a viscosity=350 mPa·s was continuously fed from the first solvent feed port 8. 100 weight parts of the dimethylpolysiloxane fluid was continuously fed from the second solvent feed port 9. A homogeneous organopolysiloxane gum solution was removed from discharge port 10. The composition was uniform up to 120 kg/hour as an organopolysiloxane gum solution. The ball valve 14 was adjusted to produce an internal pressure of 0.196 to 0.343 MPa in the extruder A during this procedure.

The organopolysiloxane gum solution was placed on a polyester film and spread out into a thin film. It was examined for the presence of undissolved organopolysiloxane gum, and it was found that undissolved organopolysiloxane gum was entirely absent. The organopolysiloxane gum solution was placed in a sample bottle, and its viscosity was 500,000 mPa·s. It did not undergo timewise variations.

Example 3

This example employed the extruder A used in Example 1 which was operated at a rotational speed of 350 rpm. 100 weight parts of a trimethylsiloxy-endblocked dimethylpolysiloxane gum having a plasticity=125 was continuously fed to the device as in Example 1. 50 weight parts of a trimethylsiloxy-endblocked dimethylpolysiloxane fluid with a viscosity=350 mPa·s was continuously fed from the first solvent feed port 8. 100 weight parts of the dimethylpolysiloxane fluid was continuously fed from the second solvent feed port 9. A homogeneous organopolysiloxane gum solution was obtained from discharge port 10. It had a viscosity of 500,000 mPa·s. The composition was uniform up to 50 kg/hour as an organopolysiloxane gum solution. The ball valve 14 was adjusted to produce an internal pressure of 0.0589 to 0.0981 MPa in the extruder A during this procedure.

Comparative Example 1

This comparative example used a co-rotating intermeshing twin screw compounding extruder turning at a rate=350 rpm. The device was the same as the extruder A used in Example 1, except that the machine used in this comparative example had only one solvent feed port. 100 weight parts of a trimethylsiloxy-endblocked dimethylpolysiloxane gum with a plasticity=125 was continuously fed to the device as in Example 1. 150 weight parts of a trimethylsiloxy-endblocked dimethylpolysiloxane fluid with a viscosity=350 mPa·s was continuously fed from the first solvent feed port 8. In this case, however, a uniform organopolysiloxane gum solution was not obtained. The ball valve 14 was adjusted to produce an internal pressure of 0.0589 to 0.0981 MPa in the extruder A during this procedure.

Comparative Example 2

This comparative example employed the extruder A used in Example 1 operating at a rotation rate of 350 rpm. 100 weight parts of a trimethylsiloxy-endblocked dimethylpolysiloxane gum with a plasticity=125 was continuously fed to the machine as in Example 1. 50 weight parts of a trimethylsiloxy-endblocked dimethylpolysiloxane fluid with a viscosity=350 mPa·s was continuously fed from the first solvent feed port 8. 100 weight parts of the dimethylpolysiloxane fluid was continuously fed from the second solvent feed port 9. In this case, however, a uniform organopolysiloxane gum solution was not obtained. Ball valve 14 was not installed on discharge port 10. As a result, the internal pressure was less than 0.00981 MPa in extruder A during this procedure.

The advantage of the production method according to the present invention is that it can continuously produce in a highly productive manner, a uniform organopolysiloxane gum solution which does not undergo any changes with elapsed time.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. In a process of continuously producing organopolysiloxane gum solutions by mixing a solvent with an organopolysiloxane gum, the improvement comprising using in the process a self-cleaning twin screw compounding extruder in which the solvent is introduced in at least two separate stages, each stage being located downstream of the point where the gum is introduced to the extruder, and maintaining an internal pressure of 0.00981 to 0.981 MPa in the extruder during the process.

2. The method according to claim 1 in which the organopolysiloxane gum has a plasticity at 25° C. measured by plasticity test in Section 8 of Japanese Industrial Standard K 6249 of 75 to 200; the solvent has a viscosity at 25° C. of 0.65 to 5,000 mPa·s; and the organopolysiloxane gum solution has a viscosity at 25° C. of 10 to 5,000,000 mPa·s.

3. The method according to claim 1 in which the extruder is a co-rotating intermeshing mixing extruder.

4. The method according to claim 3 in which the extruder includes compounding paddles, and the L/D ratio is at least 7, wherein L is the axial length of the axle, and D is the diameter of rotation of the outer tips of the paddles.

5. The method according to claim 1 in which the solvent is selected from the group consisting of aliphatic hydrocarbons, cyclic hydrocarbons, mineral oils, and organopolysiloxane fluids.

6. The method according to claim 1 in which the solvent is admixed at from 10 to 1,000 weight parts per 100 weight parts of the gum.

* * * * *